United States Patent [19]

Lawson

[11] Patent Number: 4,927,275
[45] Date of Patent: May 22, 1990

[54] EQUALIZING HYDRODYNAMIC BEARING

[75] Inventor: James L. Lawson, Simsbury, Conn.

[73] Assignee: The Torrington Company, Torrington, Conn.

[21] Appl. No.: 248,062

[22] Filed: Sep. 23, 1988

[51] Int. Cl.⁵ .............................................. F16C 17/03
[52] U.S. Cl. .................... 384/117; 384/220; 384/221; 384/312; 384/122
[58] Field of Search .................. 384/117, 122, 98, 97, 384/220, 221, 306, 312

[56] References Cited

U.S. PATENT DOCUMENTS

| 3,421,799 | 5/1967 | Tallian et al. | |
| 3,930,691 | 1/1976 | Greene | |
| 3,951,475 | 4/1976 | Okano et al. | |
| 4,403,873 | 9/1983 | Gardner | 384/306 |
| 4,496,251 | 1/1985 | Ide | 384/117 |
| 4,515,486 | 5/1985 | Ide | 384/117 |
| 4,577,379 | 3/1986 | Kramer | 384/98 |

Primary Examiner—Lenard A. Footland
Attorney, Agent, or Firm—Frank S. Troidl

[57] ABSTRACT

The hydrodynamic bearing assembly may be either a journal bearing or a thrust bearing. Bearing pads are located adjacent a shaft when a journal bearing or adjacent a collar on a shaft when a thrust bearing. The bearing pads are located on equalizing pads, two bearing pads for each equalizing pad. An elastomeric layer is disposed between the bearing pads and the equalizing pads.

17 Claims, 2 Drawing Sheets

EQUALIZING HYDRODYNAMIC BEARING

BACKGROUND OF THE INVENTION

The invention dramatically improves the load carrying distribution amongst bearing pads or shoes of hydrodynamic bearings. Equalization of the load is accomplished by attaching at least two bearing pads to each equalizing pad contained about the bearing, thereby evenly distributing the stresses or loads between the bearing pads attached to each equalizing pad.

Bearings may be classified broadly into three main categories: hydrodynamic sliding bearings, roller member bearings, and hydrostatic sliding bearings. Each of the aforementioned types of bearings have problems associated with load-carrying capacity, accuracy, lubricant requirements and friction, wear and fatigue.

Hydrodynamic sliding bearings typically operate so that the bearing surfaces which slide against each other are rigid and lubricant in the form of a film between the bearing surfaces, which is under hydrodynamic pressure generated by the motion of the bearing itself, serves to support the bearing surfaces in a spaced relation to permit relative movement of the bearing members without wear. These hydrodynamic sliding bearings may be characterized as a rigid isoviscous sliding device wherein a stationary sleeve is used to support a rotatable member such as a shaft in a stationary housing. A lubricant is provided between the interengaging cylindrical surfaces of the sleeve and shaft, whereby upon relative rotation of the bearing surfaces, the hydrodynamic lubricant pressure builds up to support the shaft.

Rolling member bearings characteristically involve bearing surfaces which are capable of rolling on each other, and lubricant being disposed between the bearing surfaces. Rolling member bearings include inner and outer rings which are spaced apart to define an annular space for a plurality of rolling members such as bails or rollers.

In hydrostatic sliding bearings, the rotating shaft is supported or floated on a body of pressurized fluid lubricant, either gaseous or liquid. Such assemblies require complex lubricating feed systems.

The present invention provides an improved hydrodynamic sliding bearing, wherein the stresses or loads on the bearings are more evenly distributed between the bearing pads. Some examples of hydrodynamic sliding bearings are described in U.S. Pat. Nos. 3,930,691 (Jerome Greene) issued Jan. 6, 1979; 4,515,486 (Russell D. Ide) issued May 7, 1985; 4,496,251 (Russell D Ide) issued Jan. 29, 1985; and 4,403,873 (Willis W. Gardner) issued Sept. 13, 1983.

The Greene patent describes a hydrodynamic sliding bearing which includes a bearing pad having a metal-elastomer laminated structure which is arcuately curved with the center of curvature of the arc being in the direction of the opposing member of the bearing. The structure of the bearing pads permits swinging thereof to produce a wedge converging in the direction of the movement of the moving member, such as a shaft. The bearing pad includes face and base sections which are bonded to a metal-elastomer laminant. This pad may be used with either jouranl or thrust bearings.

Ide ('486) describes an elastomeric supported hydrodynamic bearing which consists essentially of a number of bearing pads, each having a face member and a support member that are separated and bonded together by an elastomeric material. The face member having a load engaging surface, and its back surface having at least one arcuate portion to provide a point of inflection which opposes an identical arcuate surface providing another point of inflection located on the support member.

Ide ('251) described a hydrodynamic bearing wherein the bearing surfaces are segmented into a plurality of pads that rockingly displace themselves to form a wedge shape converging in the direction of motion with a relatively moving part. The pads are each supported in a bearing housing or support portion by a plurality of webs which are integral with the pad and the housing or support portion, which allow the pads to rock by deflection of the webs.

The Gardner patent describes a hydrodynamic thrust bearing with tilting pads. The thrust bearing pads are provided with a radially extending rib on a side that is remote from the surface of the pad that interfaces with the shaft collar. Each pad is supported on a disk that has a planar surface on which the rib of a pad bearing and each disk has a spherical surface opposite from its planar surface. The disks are supported on leveling links that have angulated but flat wings extending in opposite circumferential directions. The links have a radial hole and are supported for pivoting on a fixed pin about an axis.

Essentially, each of the aforementioned hydrodynamic bearings is mounted in such a way that it can move to permit the formation of a wedge-shaped film of lubricant between the relatively moving parts. The pads displace through a swing-type motion about a center located in front of each pad's surface, and bearing friction tends to open the wedge.

Each of these journal and thrust-type hydrodynamic bearings has a common problem with load distribution amongst the pads. The shore or bearing pad situated directly below the load has the greatest stress or highest load. Each additional bearing pad adjacent to the load carrying pad carries less and less of a load, such that the pads situated 90 degrees from the load carrying pad have zero load. This uneven load distribution amongst the pads results in some bearing pads having higher loads, greater stresses, and/or increased wear and tear.

The present inventor has realized that the aforementioned hydrodynamic bearings, whether of the thrust or journal-type, bond bearing pads separately to the outer ring or support structure which causes uneven load distribution amongst the pads. Thus, the present invention provides a unique hydrodynamic bearing which equalizes the load amongst neighboring bearing pads by disposing equalizing pads between the bearing pads and the outer support structure. Addition of equalizing pads has produced a hydrodynamic bearing which more evenly distributes stresses or loads, resulting in a bearing capable of handling more capacity or a small bearing with less frictional losses. That is, the equalizing hydrodynamic bearing of the present invention provides approximately a 50% increase in load capacity through a load zone of approximately 180 degrees, and provides a thicker lubricant film, such that the equalizing hydrodynamic bearing has less viscous shearing of the lubricant than conventional hydrodynamic bearings carrying the same load. Furthermore, the equalizing pads nullify the inherent non-roundness of the shaft or journal. Additional advantages of the present invention shall become apparent as described below.

SUMMARY OF THE INVENTION

Briefly described, the hydrodynamic bearing assembly comprises a plurality of bearing pads. A plurality of equallizing pads are disposed between the bearing pads and a support structure. An elastomeric layer is disposed between the bearing pads and the equalizing pads.

It is preferable that at least two bearing pads be attached to each equalizing pad, and that at least two equalizing pads be contained within the bearing assembly. The equalizing pads may be formed from either metals, plastics, ceramics, or powdered metals. Moreover, the equalizing pads should have an external radius that matches a corresponding radius of the support structure.

Although not necessary, the equalizing pads may be attached to the support structure by means of disposing an elastomeric layer therebetween. Each of the equalizing pads, bearing pads and support structure are attached to the elastomeric layers by either bonding or vulcanized elastomeric material at elevated temperatures under pressure or bonding them to the elastomeric layers by a chemical adhesive. The elastomeric layers can be formed of either nitrile rubber, fluorocarbon rubber, natural rubber, or the like.

Bearing pads may be either a metal or a metal covered with an elastomeric material. Preferably, bearing pads of the swing-type having a metal-elastomer laminated structure which is arcuately curved with the center of curvature of the arc being in the direction of the moving member are used in the bearing assembly of the present invention. The bearing of the present invention is capable of accommodating rotation of the load member in either direction and can be designed either as a flat thrust bearing, a journal bearing or a combination thereof. In either case, the lubricant may be air, water, glycol solution, any low viscous fluid, motor oil or petroleum. The support structure or outer ring can be formed from any of the same materials used to form the equalizing pads.

The present invention may also include many additional features which shall be further described below.

DESCRIPTION OF THE PREFERRED EMBODIMENTS

The present invention provides a novel hydrodynamic bearing assembly, especially for use as journal or thrust-type bearings. This equalizing hydrodynamic bearing more evenly distributes the stresses or loads thereon, and provides a bearing with more capacity or a smaller bearing with less frictional losses.

The equalizing pads have an external radius that matches a corresponding radius in the support structure. This radius allows the equalizing pads to swing and balance the loads on the attached bearing pads. That is, all the bearing pads on the load side of the bearing assembly will have approximately the same load and will conform to the displaced moving member or shaft. At least two bearing pads are attached to each equalizing pad to assist in balancing the load. It is conceivable, however, that more than two bearing pads can be attached to each equalizing pad. Furthermore, each bearing assembly contains at least two equalizing pads per four bearing pads.

The bearing pads should be attached to the equalizing pads in such a manner that there is sufficient space between each bearing pad to avoid touching between the bearing pads and interference with any swinging action. The spacing between the bearing pads should also permit the flow of lubricants and coolants throughout the bearing assembly. Similarly, the equalizing pads should be spaced apart sufficiently to permit the flow of lubricants and coolants throughout the bearing assembly.

Equalizing pads are formed of any stiff or rigid material, such as metals, plastics, ceramics, or powdered metals. Metals such as bronze, brass or stainless steel are preferred. Powdered metals are iron, aluminum, carbides, etc.

Figure 1:
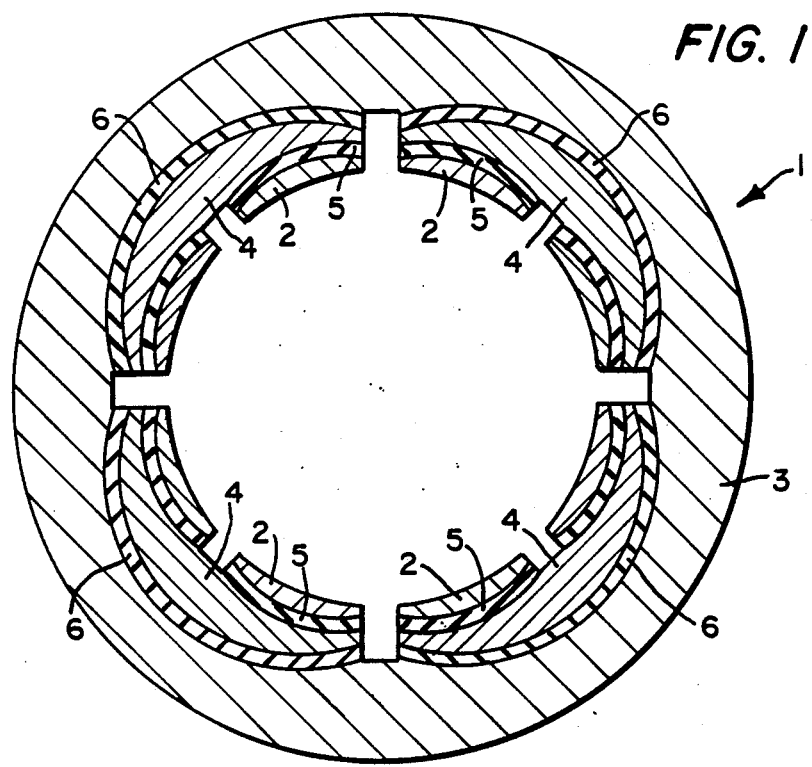
FIG. 1 is a schematic cross-sectional view of a journal-type bearing in accordance with the present invention.

The equalizing hydrodynamic bearing of the present invention can be better described by referring to the drawings. FIG. 1 is a cross-sectional view of an equalizing hydrohynamic bearing of the journal-type, wherein the moving member or shaft is not shown. FIG. 1 depicts a bearing assembly 1 which comprises a plurality of bearing pads or shoes 2, a support structure 3, a plurality of equalizing pads 4, and elastomeric layers 5 and 6. Although not shown, it is clear to one skilled in the art that a lubricant is disposed in contact with bearing pads 2 and the moving member.

Bearing pads or shoes 2 are typically formed from either metal or metals covered with an elastomeric material. Elastomerically covered metal bearing pads are used when air or water is the primary lubricant. Metallic-type bearing pads are formed from bronze, stainless steel, brass, or the like.

A preferred bearing pad 2 is a swing-type pad having a metal-elastomer laminated structure which is arcuately curved with the center of curvature of the arc being in the direction of the moving member or shaft. U.S. Pat. No. 3,930,691 (Greene) describes the swing-type pad contemplated by the present invention and the teachings thereof are incorporated herein by reference.

The lubricant may be either air, water, glycol solution, any low viscous fluid, motor oil, or petroleum.

The outer ring or support structure 3 of bearing assembly 1 is formed from any stiff or rigid material, such as metals, plastics, ceramics, or powdered metals.

A plurality of equallizing pads 4 are disposed between bearing pads 2 and support structure 3 in such a way that equalizing pads 4 have an external radius which matches a corresponding radius of support structure 3. This radius allows equalizing pads 4 to swing and balance the loads on bearing pads 2 attached thereto. Thus, all bearing pads 2 on the load side of bearing assembly 1 have approximately the same load and will conform to the displaced moving member of shaft.

An elastomeric layer 5 is disposed between bearing pads 2 and equalizing pads 4. Optionally, an elastomeric layer 6 may be disposed between the equalizing pads 4 and support structure 3. These elastomeric layers are formed from a material selected from the group consisting of nitrile rubber, fluorocarbon rubber, natural rubber, and the like.

Bearing pads 2 and equalizing pads 4 are attached to elastomeric layer 5 by either bonding of vulcanized elastomeric material at elevated temperatures, approximately 300 degrees Fahrenheit, under pressure wherein the elastomeric material is injected therebetween by hydraulic pressure, or bonding them to the elastomeric layer by chemical adhesives or binders. Similarly, elastomeric layer 6 may be bonded to equalizing pads 4 and support structure 3. Optionally, elastomeric layer 6 may only be bonded to equalizing pads 4 permitting free flotation of equalizing pads 4 about support structure 3.

The number of bearing pads 2 and equalizing pads 4 shown in FIG. 1 are for representational purposes only and it is to be clearly understood that this invention encompasses any combination of bearing pads and equalizing pads. However, at least two bearing pads 2 are attached to each equalizing pad 4 and there are at least two equalizing pads 4 for every four bearing pads 2 in bearing assembly 1. Theoretically, some applications may require the use of hundreds of bearing pads requiring the use of a proportional number of equalizing pads to assure even load distribution.

Figure 2:
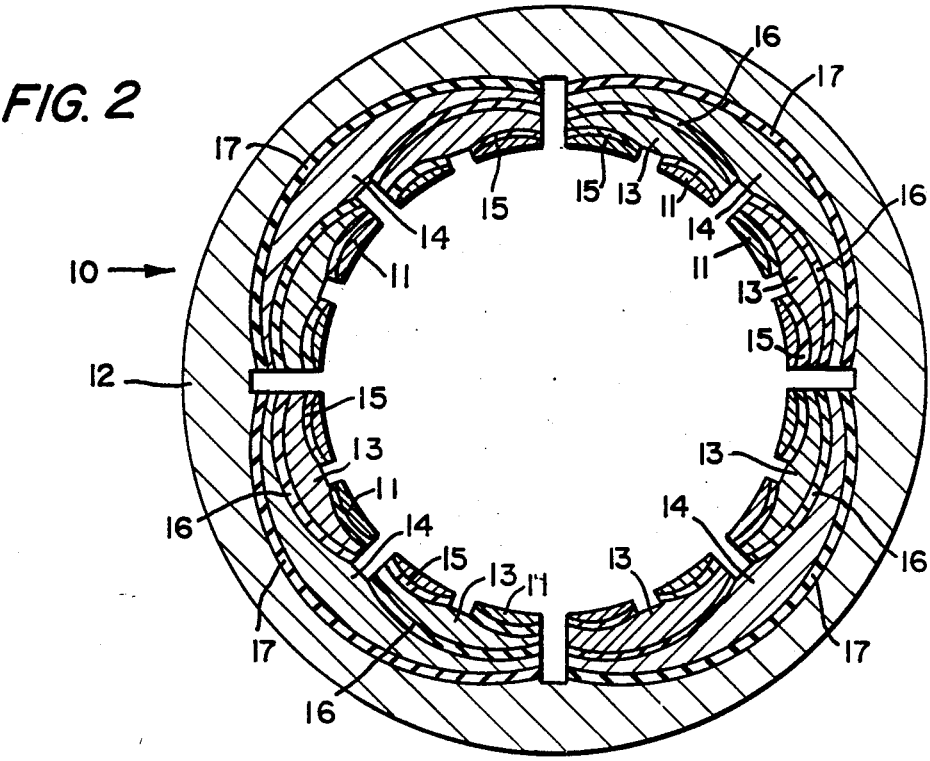
FIG. 2 is a schematic cross-section view of a journal-type bearing having primary and secondary equalizing pads.

FIG. 2 is another embodiment of the equalizing hydrodynamic bearing in accordance with the present invention, wherein secondary equalizing pads are positioned behind every two primary equalizing pads containing bearing pads attached thereto so that more bearing pads per bearing assembly may be permitted. A bearing assembly 10 for supporting an opposing moving member or shaft (not shown herein) comprises a plurality of bearing pads 11 adjacent to the moving member, support structure 12, a lubricant (not shown herein) in contact with bearing pads 11 and the moving member, a plurality of primary equalizing pads 13 disposed between bearing pads 11 and support structure 12, a plurality of secondary equalizing pads 14 disposed between primary equalizing pads 13 and support structure 12, a first elastomeric layer 15 disposed between bearing pads 11 and primary equalizing pads 13, a second elastomeric layer 16 disposed between primary equalizing pads 13 and secondary equalizing pads 14, and a third elastomeric layer 17 disposed between secondary equalizing pads 14 and support structure 12.

Bearing pads 11, primary equalizing pads 13, secondary equalizing pads 14, and support structure 12 are bonded to elastomeric layers 15, 16, and 17 as described above. Optionally, support structure 12 does not have to be bonded to elastomeric layer 17, thereby permitting the free floating of secondary equalizing pads 14 about bearing assembly 10. The external radius of secondary equalizing pads 14 matches a corresponding radius of support structure 12.

Figure 3:
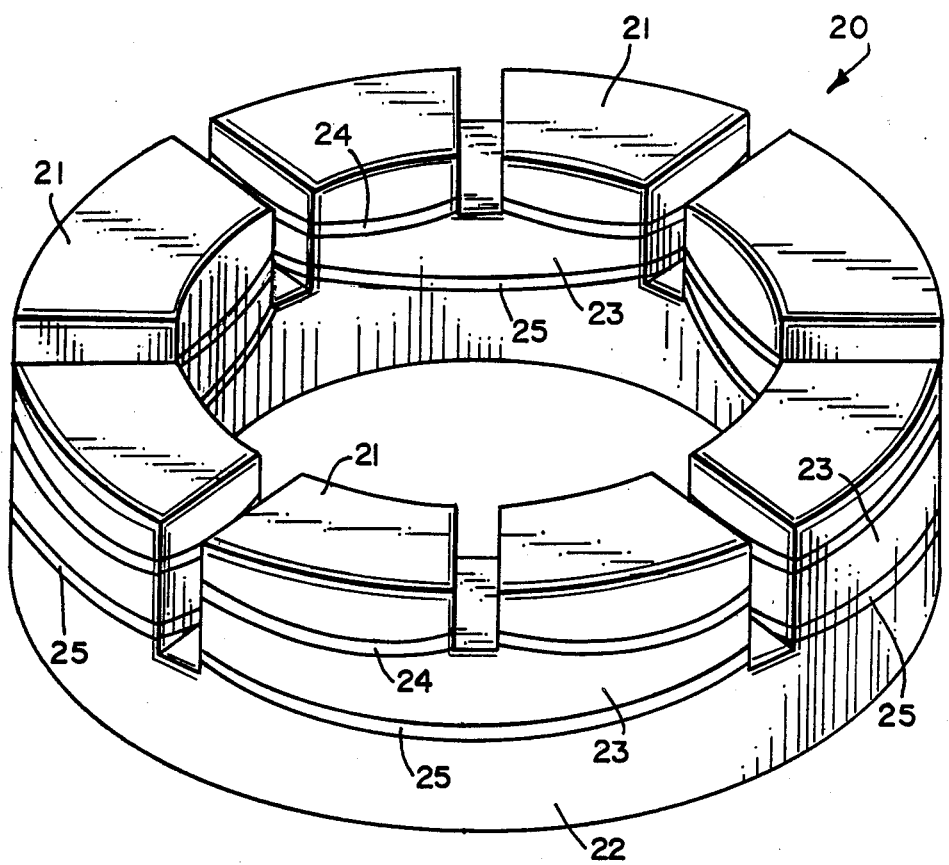
FIG. 3 is a schematic top-front perspective view of a thrust bearing in accordance with the present invention.

FIG. 3 shows an equalizing hydrodynamic bearing of the thrust-type provided in accordance with the present invention. A thrust-type bearing assembly 20 is shown having a plurality of bearing pads 21 adjacent to a moving member, such as a shaft with a collar facing the top surface of bearing pads 21. A thrust-type bearing assembly 20 also includes a support structure 22, a lubricant (not shown herein) in contact with bearing pads 21 and a moving member, a plurality of equalizing pads 23 disposed between bearing pads 21 and support structure 22, and elastomeric layers 24 and 25 disposed between bearing pads 21, equalizing pads 23 and support structure 22, respectively.

While I have shown and described several embodiments in accordance with my invention, it is to be clearly understood that the same are susceptible to numerous changes and modifications apparent to one skilled in the art. Therefore, I do not wish to be limited to the details shown and described but intend to include all changes and modifications which come within the scope of the appended claims.

What is claimed is:

1. A hydrodynamic bearing assembly for supporting an opposing moving member, said bearing assembly comprising: a plurality of bearing pads adjacent to said moving member; a support structure; a plurality of equalizing pads disposed between said bearing pads and said support structure; and an elastomeric layer disposed between said bearing pads and said equalizing pads, wherein at least two bearing pads are attached to each equalizing pad.

2. The hydrodynamic bearing assembly according to claim 1, wherein said equalizing pads have an external radius that matches a corresponding radius of said support structure.

3. The hydrodynamic bearing assembly according to claim 1, wherein there are at least two equalizing pads.

4. The hydrodynamic bearing assembly according to claim 1, wherein a second elastomeric layer is disposed between said equalizing pads and said support structure.

5. The hydrodynamic bearing assembly according to claim 4, wherein said equalizing pads, bearing pads and support structure are attached to said elastomeric layers by either bonding or vulcanized elastomeric material at elevated temperatures under pressure or bonding them to said elastomeric layers by an adhesive.

6. The hydrodynamic bearing assembly according to claim 1, wherein said bearing pads are either a metal or a metal covered with an elastomeric material.

7. The hydrodynamic bearing assembly according to claim 1, wherein said bearing pads are swing-type pads having a metal-elastomer laminated structure.

8. The hydrodynamic bearing assembly according to claim 1, wherein said hydrodynamic bearing assembly is a journal bearing.

9. The hydrodynamic bearing assembly according to claim 1, wherein said hydrodynamic bearing assembly is a thrust bearing.

10. The hydrodynamic bearing assembly according to claim 1, wherein said elastomeric layer is formed from a material selected from the group consisting of: nitrile rubber, fluorocarbon rubber, and natural rubber.

11. The hydrodynamic bearing assembly according to claim 1, wherein said equalizing pads are formed from a material selected from the group consisting of: metals, plastics, ceramics, and powdered metals.

12. The hydrodynamic bearing assembly according to claim 1, wherein said support structure is formed from a material selected from the group consisting of: metals, plastics, ceramics, and powdered metals.

13. The hydrodynamic bearing assembly according to claim 1, wherein said bearing pads are spaced apart sufficiently to avoid contact with each other and to permit the flow of lubricant throughout said bearing assembly.

14. A hydrodynamic bearing assembly for supporting an opposing moving member, said bearing assembly comprising: a plurality of bearing pads adjacent to said moving member; a support structure; a plurality of primary equalizing pads disposed between said bearing pads and said support structure; a plurality of secondary equalizing pads disposed between said primary equalizing pads and said support structure; a first elastomeric layer disposed between said bearing pads and said primary equalizing pads; and a second elastomeric layer disposed between said primary equalizing pads and said secondary equalizing pads, wherein at least two bearing pads are attached to each primary equalizing pad.

15. The hydrodynamic bearing assembly according to claim 14, wherein said primary and secondary equalizing pads are formed from a material selected from the group consisting of: metals, plastics, ceramics, and powdered metals.

16. The hydrodynamic bearing assembly according to claim 14, wherein at least two primary equalizing pads are attached to each secondary equalizing pad.

17. The hydrodynamic bearing assembly according to claim 14, wherein a third elastomeric layer is disposed between said secondary equalizing pads and said support structure.

* * * * *